ROBERT P. BABBITT,
RAYMOND E. WIEVEG,
INVENTOR.

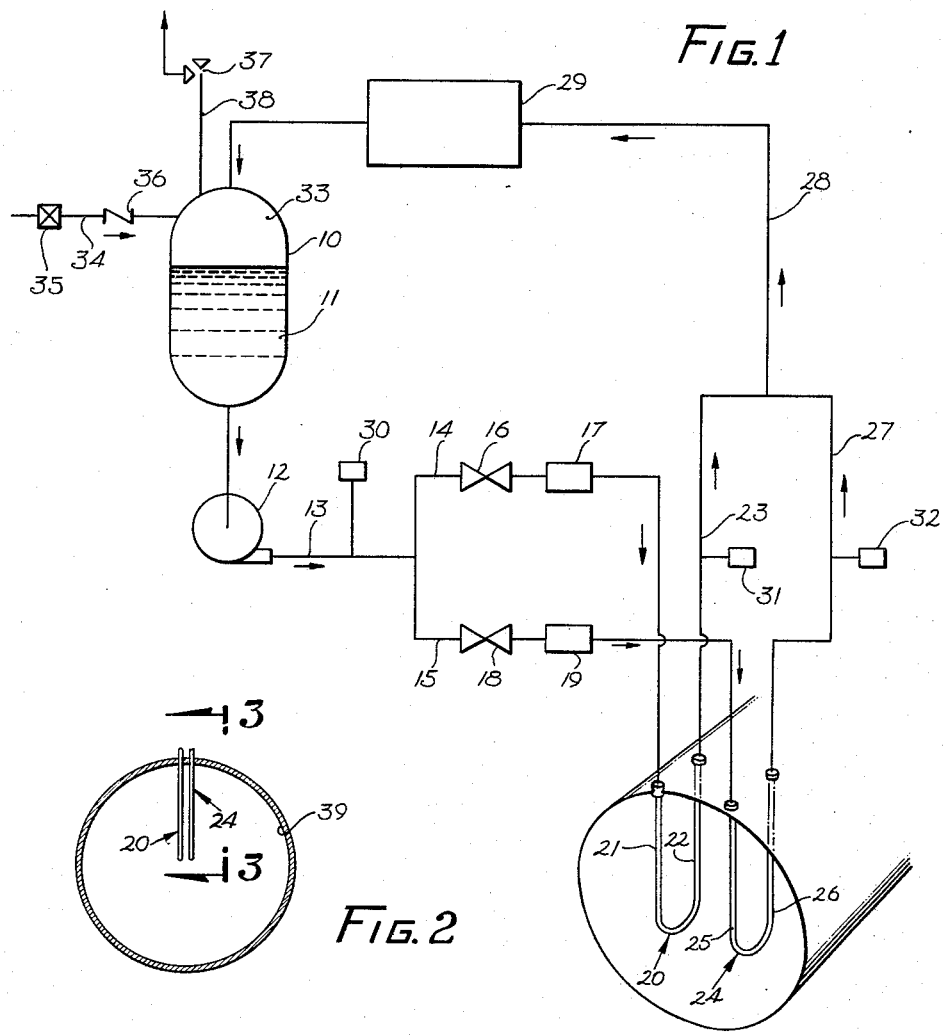
Fig. 1
Fig. 2
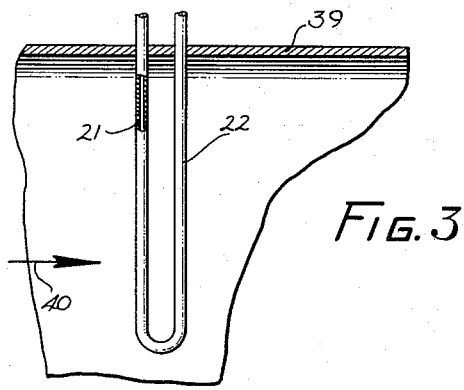
Fig. 3
Nov. 23, 1965 — R. P. BABBITT ETAL — 3,218,860
APPARATUS AND METHOD FOR MEASURING HIGH TEMPERATURES
Filed Feb. 18, 1963 — 2 Sheets-Sheet 1
ROBERT P. BABBITT,
RAYMOND E. WIEVEG,
INVENTOR.
BY R. E. Geauque
ATTORNEY

ATTORNEY

United States Patent Office 3,218,860
Patented Nov. 23, 1965

3,218,860
APPARATUS AND METHOD FOR MEASURING HIGH TEMPERATURES
Robert P. Babbitt, Granada Hills, and Raymond E. Wieveg, Canoga Park, Calif., assignors to The Marquardt Corporation, Van Nuys, Calif., a corporation of California
Filed Feb. 18, 1963, Ser. No. 258,978
10 Claims. (Cl. 73—349)

This invention relates to an apparatus and method for measuring high gas temperature and more particularly to an apparatus and method for directly measuring the total temperature of very hot flowing gases, such as encountered in rocket engine exhaust and in combustion products of high Mach number air-breathing engines.

The measuring of the high temperature of combustion products is complicated by the fact that the gas film heat transfer coefficient between the gas and the measuring device cannot be definitely determined. The value of this coefficient depends upon the physical and thermal characteristics of the gas and these characteristics vary widely with the fuel-air ratio and other factors. Also, the maximum gas temperature which can be measured is determined by the physical strength of the probe at high temperatures and if the probe is cooled, errors are introduced in the temperature measurement which must be accounted for by individual calibration of each probe. Thermocouples, which are widely used for temperature measurement, are limited to relatively low gas temperatures because of the physical effect of high temperatures on the thermocouple material. Also, optical pyrometers utilized for measurement of furnace temperature are not satisfactory for measurement of temperature of supersonic streams since it cannot be determined whether the observed temperature is total or static temperature.

The present invention overcomes the problems of variations in gas physical and thermal characteristics and loss of structural strength at high temperature. The apparatus of the invention utilizes two probes in the form of tubes which are immersed side by side in the gas stream, and water is pumped through the probes at different rates. By measuring the entering water temperature and the temperature of water leaving each probe and by measuring the flow rate through each probe, the gas temperature is easily calculated independently of gas physical and thermal characteristics and such calculations can be facilitated by the use of a series of graphs. Also, since water continuously flows through each probe, the physical strength of the probe is maintained at high temperatures since the probes are not subject to the gas temperature. While the invention is described in connection with measurement of gas temperature, it is suitable for measuring the temperature of a variety of fluids.

It is therefore an object of the present invention to provide an apparatus and method for measurement of high gas temperature without being sensitive to variations in gas physical and thermal characteristics.

Another object of the invention is to provide an apparatus for measuring fluid temperatures which utilizes probes maintained at a lower temperature than that of the fluid being measured so that the physical strength of the probe is maintained at high fluid temperatures.

Another object of the invention is to provide an apparatus for direct and simple measurement of high gas temperatures which is insensitive to varying gas characteristics and which need not be calibrated for each individual installation.

These, and other objects of the invention not specifically set forth above, will become readily apparent from the accompanying description and drawings in which:

FIGURE 1 is a schematic illustration of the apparatus of the subject invention showing the two probes in perspective;

FIGURE 2 is a sectional view through a flow passage showing the probes in elevation and located side by side in the flow passage at the same axial location;

FIGURE 3 is a view taken along line 3—3 of FIGURE 2 showing one of the probes in section;

Figures 4, 5:
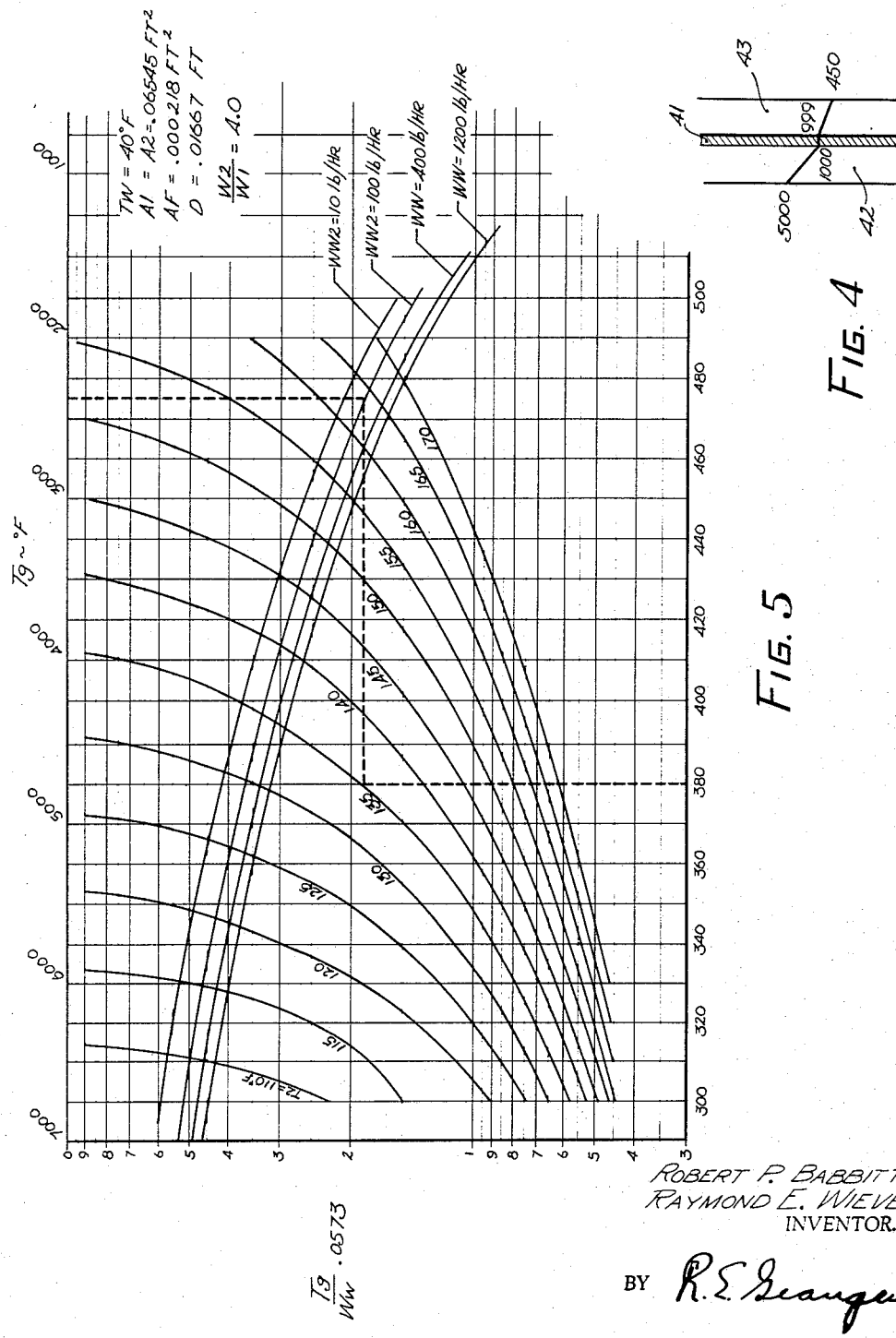
FIGURE 4 is a plot of a typical temperature gradient through the gas and water films adjacent a probe surface.
FIGURE 5 is a typical graph for computing total gas temperature from the measurements obtained with the present invention.

Referring to FIGURE 1, one form of the invention is shown as having a tank 10 containing a supply of water 11. A circulating pump 12 is located in line 13 which connects tank 10 with two lines 14 and 15. Line 14 contains a flow regulating valve 16 and a flowmeter 17 downstream of the valve. In a similar manner, line 15 contains a flow regulating valve 18 and a flowmeter 19 downstream of valve 18. A first probe 20 in the form of a U-shaped tube, has leg 21 connected with line 14 and leg 22 connected with output passage 23. Second probe 24 is also in the form of a U-shaped tube and has leg 25 connected with line 15 and leg 26 connected with outlet passage 27. Outlet passages 23 and 27 connect with a common discharge passage 28 leading through heat exchanger 29 back to tank 10.

The temperature of the water entering probes 20 and 24 is measured in line 13 by resistance thermometer 30 of any standard, well known construction, and the temperature of the water leaving probes 21 and 24 is measured by resistance thermometers 31 and 32 associated with passages 23 and 27, respectively. The tank 10 can be pressurized by gaseous nitrogen introduced to space 33 from a gas source through gas supply line 34 containing pressure regulator 35 and check valve 36, each of standard, well known construction. Pressure safety relief is provided by relief valve 37 connected with space 33 by line 38. The heat exchanger 29 can be provided with a suitable cooling medium which cools the water from the probes prior to being returned to the tank 10.

As illustrated in FIGURES 2 and 3, probes 20 and 24 are immersed, side by side, in the gas stream flowing through passage 39 in the direction of arrow 40. The probes are so positioned that the plane passing through each leg is parallel to the axis of passage 39. The probes are at the same axial location in the gas passage as illustrated in FIGURES 2 and 3 so that the probes are subject to the same total temperatures in the gas stream. The probes are the same size in all respects and are placed as closely together as possible without interfering with identical gas flow over the probe surfaces.

Referring to FIGURE 4, a portion 41 of the side wall of one of the probes is illustrated with the gas film 42 on one side and the water film 43 on the other side. The temperatures indicated are for one operating condition only and it is apparent that the maximum temperature drop occurs across the gas film 42. Since the gas film drop is critical, changes in the characteristics of the gas in passage 39 must be accurately accounted for if the gas temperature is to be correctly measured. In the measurement of the temperature of gases resulting from combustion, it is difficult to determine the exact resulting combination of gases because the combination is subject to variation with changes in fuel-air ratio and other combustion conditions. Also, for any given gas mixture, the gas film heat transfer coefficient ($h_g$) is a function of specific heat, viscosity, flow velocity, dissociation, ionization, etc. and is therefore difficult to determine.

On the other hand, the water film heat transfer coefficient ($h_w$) for water flowing through a tube has been the subject of considerable investigation and is well documented. While the probes 20 and 24 have the same diameter and wall thickness, the probes have different flow rates. However, the values of the water film coefficient can be easily calculated for different flow velocities and Reynolds number. While the present invention requires that the water side coefficients for both probes be determined, it eliminates the necessity of determining the gas film coefficients.

Since the gas flowing past the two probes has the same physical and thermal characteristics, the gas film coefficients for the probes are equal. The equations for the gas film coefficients for probes 20 and 24 can be written as follows, wherein the subscripts designate the probe $$h_{g20} = \frac{W_{w20} C_p (T_{20} - T_w)}{A_{20}\left(T_g - \frac{T_{20} + T_w}{2}\right) - \frac{W_{w20} C_p (T_{20} - T_w)}{h_{w20}}}$$

$$h_{g24} = \frac{W_{w24} C_p (T_{24} - T_w)}{A_{24}\left(T_g - \frac{T_{24} + T_w}{2}\right) - \frac{W_{w24} C_p (T_{24} - T_w)}{h_{w24}}}$$

where $T_g$ is gas temperature; $T_w$ is water inlet temperature; $T$ is water outlet temperature; $h_w$ is water film heat transfer coefficient; $W_w$ is water flow rate; $A$ is tube heat transfer surface area; $h_g$ is gas film heat transfer coefficient; $C_p$ is specific heat of water.

Equating the above two equations and solving for $$T_g = \frac{A_{24} W_{w20}(T_{20} - T_w)\left(\frac{T_{24} + T_w}{2}\right) - A_{20} W_{w24}(T_{24} - T_w)\left(\frac{T_{20} + T_w}{2}\right)}{A_{24} W_{w20}(T_{20} - T_w) - A_{20} W_{w24}(T_{24} - T_w)} + \frac{W_{w20} W_{w24} C_p (T_{20} - T_w)(T_{24} - T_w)\left(\frac{1}{h_{w24}} - \frac{1}{h_{w20}}\right)}{A_{24} W_{w20}(T_{20} - T_w) - A_{20} W_{w24}(T_{24} - T_w)}$$

In order to solve the above equation for $T_g$, the following value of $h_w$ must be obtained $$h_w = .0038\left(1 + .013 \frac{T + T_m}{2}\right) \frac{W^{.8}}{D^{.7} A_f^{.8}}$$

where $A_f$ is water flow area in tube; $D$ is tube inside diameter; $T_m$ is metal temperature.

It can be shown that $$T_m = \frac{W_w C_p}{h_w A}(T - T_w) + \frac{T + T_w}{2}$$

By substituting the value of $T_m$ in the immediately preceding equation, the values of $h_{w20}$ and $h_{w24}$ can be obtained in terms of known variables. With these values determined, the equation of $T_g$ can be solved by obtaining the temperatures $T_w$, $T_{20}$ and $T_{24}$ from thermometers 30, 31 and 32, respectively, and by obtaining the flow rates $W_{w20}$ and $W_{w24}$ from flowmeters 17 and 18, respectively. It is therefore apparent that the apparatus of the present invention is not sensitive to physical and thermal characteristics of the high temperature gas since it is unnecessary to evaluate the gas film heat transfer coefficient ($h_g$) which would be the same for each probe.

FIGURE 5 illustrates a plot of $T_g/W_w^{.0573}$ against $T_{20}$ and $T_g$ in degrees F. for a plurality of values of $T_{24}$ and $W_{w24}$. As stated on FIGURE 5, the plot is based upon the following constant values:

$T_w = 40°$ F.; $A_{20} = A_{24} = .06545 Ft^2$;

$A_f = .000218 Ft^2$; $D = .01667 Ft$; $\frac{W_{w24}}{W_{w20}} = 4.0$

Since only $T_w$ of the above constants is subject to change, a series of plots similar to FIGURE 5 can be made for each value of $T_w$ so that the measurement of the value will determine the chart to be utilized to arrive at $T_g$.

In order to obtain $T_g$ from FIGURE 5, when $T_w$ is 40° F., a vertical dashed line segment 45 is drawn between the measured temperature $T_{20}$ and the graph line corresponding to the measured temperature $T_{24}$. The particular values chosen are 380° F. for $T_{20}$ and 130° F. for $T_{24}$. The end of line segment 45 is connected by a horizontal line segment 46 to the curve corresponding to the absolute flow rate $W_{w24}$ through the probe 24 which has the higher flow rate. The value of 100 lbs./hr. is chosen for $W_{w24}$. From the end of line segment 46, a vertical line segment 47 is drawn to the top of the plot which is calibrated in $T_g°$ F. With the chosen values, the gas temperature would be 2375° F. Thus, the gas temperature can be easily and quickly computed from the five measured variables provided by the apparatus of the present invention.

As is apparent from FIGURE 4, at a gas temperature of 5000° F. the probe surface temperature is approximately 1000° F. which can be easily withstood by stainless steel and therefore no special metals are required for the probes. In operation of the apparatus, the slower flow rate $W_{w20}$ is selected to provide a temperature $T_{20}$ within the maximum allowable water temperature at the particular water pressure. At a water pressure of 1000 p.s.i., the limit of temperature $T_{20}$ is about 500° F. With a flow ratio of 4, the flow rate $W_{w24}$ can be set after an acceptable flow rate $W_{w20}$ is selected which maintains $T_{20}$ below the maximum, and the value of $T_{24}$ will be much less than that of $T_{20}$ since probe 24 has the faster flow rate. The value of the flow ratio can, of course, be varied and thereby vary the differential between the two temperatures. Also, the dimensions of the probes, such as tube diameter, length, wall thickness, bend radius, etc., can be varied depending upon the particular fluid and flow conditions involved in the temperature measurement. The temperature of a wide variety of fluids, such as combustion gases, steam, liquids, liquid metal, etc. can be measured and for each fluid, the value of $h_g$ cancels out. The probes 20 and 24 have been described as being of the same size in all respects since the active areas of the tubes will then be the same and the area of the back legs blocked off by the front legs of each probe will also be the same. However, under some conditions utilizing some probe shapes, the probes could be of different sizes since the active heat transfer area would be directly proportional to the actual tube area. While water is used as the cooling fluid because of its specific heat, other cooling fluids can be utilized. Various other modifications are contemplated by those skilled in the art without departing from the spirit and scope of the invention as hereinafter defined by the appended claims.

What is claimed is:

1. An apparatus for obtaining the temperature of a fluid comprising
   a pair of probes located in said fluid so as to be subject to the same physical and thermal characteristics of said fluid, each of said probes comprising a tube connected at its inlet end with a source of cooling fluid,
   means for adjusting the flow rate of cooling fluid in each probe for providing different flow rates in the probes, and
   means for measuring the temperature of the cooling fluid entering and leaving each probe and the flow rate of the cooling fluid through each probe in order to obtain quantities from which the fluid temperature can be determined.

2. An apparatus as defined in claim 1 wherein said tubes are connected at their inlet end to a common source of water utilized as the cooling fluid.

3. An apparatus for measuring the temperatures of gas flowing in a conduit comprising
   a pair of probes located side by side in said conduit so as to be subject to gas having the same physical and thermal characteristics, each of said probes comprising a tube connected at its inlet end with the said source of water, means for adjusting the flow rate in each probe for providing different flow rates in the probes in accordance with a selected flow ratio, means for measuring the temperature of said water source entering said probes and the flow rate through each probe, and means for measuring the temperature of the water discharged from each probe at the discharge end thereof, the total temperature of said gas being a function of the five quantities obtainable from said apparatus.

4. An apparatus as defined in claim 3 wherein said tubes are of the same size in all dimensions and are U-shaped with the plane of each tube being parallel to the axis of said conduit.

5. An apparatus as defined in claim 3 having a common passage connected to the discharge ends of said probes, said common passage connecting with said water source for returning thereto the water discharged from said probes and containing a heat exchanger for removing the heat added to the water while passing through said probes.

6. A method of measuring the temperature of a fluid comprising the steps of placing two probes in the form of tubes in said fluid so as to subject the probes to the same physical and thermal characteristics of said fluid, passing a cooling fluid through each probe, regulating the cooling fluid flow to provide different flow rates in the probes, and measuring the temperature of the cooling fluid entering and leaving the probes and the flow rate of the cooling fluid through each probe to obtain quantities from which the fluid temperature can be determined.

7. A method as defined in claim 6 wherein the two probes are connected to the same source of cooling fluid to provide the same fluid entering temperatures to each probe.

8. A method for measuring the temperature of a gas flowing in a conduit comprising the steps of placing two probes in the form of tubes of the same size side by side in said conduit so as to be subject to gas having the same physical and thermal characteristics, passing a cooling fluid through both probes at different flow rates, and measuring the temperature of the cooling fluid entering and leaving the probes and the flow rate of the cooling fluid through each probe to obtain quantities from which the fluid temperature can be determined.

9. A method as defined in claim 8 wherein the two probes are connected to a common water source used as the cooling fluid and providing the same fluid entering temperature to each probe.

10. A method as defined in claim 9 including the step of cooling the water discharged from each probe and then returning the discharged water to said source.

References Cited by the Examiner

UNITED STATES PATENTS

| 300,202 | 6/1884 | Boulier | 73—349 |
| 497,268 | 5/1893 | Eynon | 73—349 |
| 2,356,607 | 8/1944 | O'Brien | 73—349 |

FOREIGN PATENTS 5,731  10/1878  Germany.

LOUIS R. PRINCE, *Primary Examiner.*